US012173895B2

United States Patent
Shan et al.

(10) Patent No.: US 12,173,895 B2
(45) Date of Patent: Dec. 24, 2024

(54) OXYGEN-ENRICHED ACID GAS INCINERATOR BURNER AND WORKING METHOD THEREOF

(71) Applicant: Luoyang Xinpu Petrochemical Equipment Development Co., Ltd., Luoyang (CN)

(72) Inventors: Zhongmin Shan, Luoyang (CN); Ligang Deng, Luoyang (CN); Yue Wang, Luoyang (CN)

(73) Assignee: Luoyang Xinpu Petrochemical Equipment Development Co., Ltd., Luoyang (CN)

( * ) Notice: Subject to any disclaimer, the term of this patent is extended or adjusted under 35 U.S.C. 154(b) by 417 days.

(21) Appl. No.: 17/712,245

(22) Filed: Apr. 4, 2022

(65) Prior Publication Data
US 2023/0124272 A1    Apr. 20, 2023

(30) Foreign Application Priority Data
Oct. 20, 2021 (CN) .......................... 202111220645.2

(51) Int. Cl.
*F23G 7/06* (2006.01)
*F23D 11/00* (2006.01)
*F23G 5/32* (2006.01)
*F23L 7/00* (2006.01)
*F27D 1/00* (2006.01)

(52) U.S. Cl.
CPC ............ *F23G 7/065* (2013.01); *F23D 11/002* (2013.01); *F23G 5/32* (2013.01); *F23L 7/007* (2013.01); *F27D 1/0003* (2013.01); *F23G 2204/103* (2013.01); *F23G 2900/70* (2013.01)

(58) Field of Classification Search
CPC ........... F23G 7/065; F23G 5/32; F23D 11/002
USPC .............................................. 431/5, 181–182
See application file for complete search history.

(56) References Cited

U.S. PATENT DOCUMENTS 4,988,287 A * 1/1991 Stegelman .............. F23D 14/66
431/351

* cited by examiner

*Primary Examiner* — Vivek K Shirsat
(74) *Attorney, Agent, or Firm* — Shih IP Law Group, PLLC

(57) ABSTRACT

Disclosed are an oxygen-enriched acid gas incinerator burner. A refractory lining is arranged on an inner wall of a housing. A rear part of an inner cavity of the housing is connected to a throat opening. A pure oxygen spray gun, an acid gas spray gun, and a fuel gas spray gun are arranged in a pipe-in-pipe structure from outside to inside. A rear part of the pure oxygen spray gun is fixed within the inner cavity. A front part of the acid gas spray gun is fixed through a flange at an outer end of the pure oxygen spray gun. A front part of the fuel gas spray gun is fixed through a flange at an outer end of the acid gas spray gun. A combustion-supporting air inlet is formed on the housing, and a lower part thereof is communicated with a gas collection chamber.

20 Claims, 3 Drawing Sheets

OXYGEN-ENRICHED ACID GAS INCINERATOR BURNER AND WORKING METHOD THEREOF

CROSS REFERENCE TO RELATED APPLICATION

This patent application claims the benefit and priority of Chinese Patent Application No. 202111220645.2 filed on Oct. 20, 2021; the disclosure of which is incorporated by reference herein in its entirety as part of the present application.

TECHNICAL FIELD

The present disclosure relates to a burner, and in particular, to an oxygen-enriched acid gas incinerator burner applicable to a heat reaction furnace in a sulfur recovery device and a working method thereof.

BACKGROUND ART

It is well known that sulfur has great harm in an oil refining process. The function of a sulfur recovery device is to treat hydrogen sulfide-containing acid gas produced by oil refineries, chemical plants, etc., recover chemical raw material sulfur, and then perform exhaust treatment, so as to turn harm into profit, reduce pollution, and realize clean production.

An acid gas incinerator is the core part of the sulfur recovery device. Under normal operating conditions, 60% to 70% sulfur is generated in the incinerator, and the rest is generated in a subsequent catalytic reactor. An acid gas incinerator burner provides a stable flame for complete combustion of both impurities and $H_2S$. The sulfur recovery rate of the overall device depends on the use performance of an acid gas burner to a great extent. An air combustion supporting system of the existing burner is low in flame temperature, low in heat transfer efficiency, low in energy utilization rate, and large in smoke exhaust volume. Therefore, it becomes a basic demand of those skilled in the art to propose an oxygen-enriched acid gas incinerator burner capable of improving the heat efficiency and yield, and reducing the smoke volume and the emission of pollutants.

SUMMARY

In order to overcome the shortcomings in the background art, the present disclosure discloses an oxygen-enriched acid gas incinerator burner and a working method thereof.

To achieve the objective of the present disclosure, the present disclosure adopts the following technical solutions.

An oxygen-enriched acid gas incinerator burner includes a propulsion mechanism, a pure oxygen spray gun, an acid gas spray gun, a fuel gas spray gun, and a housing. A refractory lining is arranged on an inner wall of the housing; an inner cavity is formed in an inner center of the housing at an end of the housing; a rear part of the inner cavity is connected to a throat opening; the pure oxygen spray gun, the acid gas spray gun, and the fuel gas spray gun are arranged in a pipe-in pipe structure from outside to inside; a rear part of the pure oxygen spray gun is fixed within the inner cavity through a flange at an outer end of the housing; a front part of the acid gas spray gun is fixed through a flange at an outer end of the pure oxygen spray gun; a front part of the fuel gas spray gun is fixed through a flange at an outer end of the acid gas spray gun; a combustion-supporting air inlet is formed at a position, corresponding to the throat opening, on the housing; a lower part of the combustion-supporting air inlet is communicated with a gas collection chamber; the gas collection chamber is formed by building bricks made of a zirconium-containing corundum material, is arranged along a circumferential surface of the throat opening, and is arranged in the refractory lining; a circle of diversion holes communicated with the throat opening are formed in the gas collection chamber; and the diversion holes are in a right-handed rotation arrangement when looked from an upstream direction, and the diversion holes are uniformly distributed along a circumferential direction of the gas collection chamber.

For the oxygen-enriched acid gas incinerator burner, a flame stabilizing cover is arranged at a position, close to the throat opening, on a rear part of the fuel gas spray gun; a fuel gas inlet is formed in the rear part of the fuel gas spray gun; and a rear end of the fuel gas spray gun is connected with a ball valve and a high-energy igniter in sequence.

For the oxygen-enriched acid gas incinerator burner, a pure oxygen inlet is formed in the rear part of the pure oxygen spray gun; an acid gas inlet is formed in a rear part of the acid gas spray gun; and a fuel gas inlet is formed in the rear part of the fuel gas spray gun.

For the oxygen-enriched acid gas incinerator burner, the throat opening is formed by casting the refractory lining; a front end of the throat opening is a horn-shaped tapered section, and a rear part of the tapered section is communicated with a straight section.

For the oxygen-enriched acid gas incinerator burner, the refractory lining includes two layers; a heat insulating lining is arranged inside the refractory lining; an outer layer of the two layers is made of a heavy corundum lining with a specific gravity of 3.1 and a refractoriness of 1790° C.; an inner outer of the two layers is made of a high-aluminum hollow ball castable lining with 85% of Al3O2; and the heat insulating lining is made of a high-aluminum material with a specific gravity of 1.4, a refractoriness of 1650° C. and a highest operating temperature of 1400° C.

For the oxygen-enriched acid gas incinerator burner, an acid gas cyclone is arranged on an outer wall of a diversion pipe of the acid gas spray gun.

For the oxygen-enriched acid gas incinerator burner, the flame stabilizing cover is formed by combining a horn-shaped tapered stainless steel housing and a corundum castable filled inside the horn-shaped tapered stainless steel housing.

For the oxygen-enriched acid gas incinerator burner, a flame detector A and a flame detector B are fixed on the housing at an interval; inner ends of the flame detector A and the flame detector B are communicated with the throat opening.

For the oxygen-enriched acid gas incinerator burner, a fire observation hole A and a fire observation hole B are also formed in the housing at an interval.

For a working method of the oxygen-enriched acid gas incinerator burner, in an oxygen-excess combustion manner, external mixed diffusion combustion is realized by introducing combustion-supporting air, and specific operation steps are as follows: introducing acid gas through the acid gas inlet, introducing fuel gas through the fuel gas inlet, introducing combustion-supporting air through the combustion-supporting air inlet, mixing the combustion-supporting air with the fuel gas and the acid gas through the circle of diversion holes in the gas collection chamber, and spraying mixed gas into the combustion chamber through the throat opening.

For a working method of the oxygen-enriched acid gas incinerator burner, in an oxygen-enriched combustion manner, pure oxygen is introduced to participate in combustion on a basis of an oxygen-excess combustion, and specific operation steps are as follows: introducing combustion-supporting air through the combustion-supporting air inlet, introducing pure oxygen through the pure oxygen inlet, activating and deactivating introduction of the pure oxygen under control of a Programmable Logic Controller according to a predetermined proportionality coefficient, that is, intermittently introducing the pure oxygen to participate in combustion to enhance a heat transfer process, and spraying a mixed gas into the combustion chamber through the throat opening after the pure oxygen is mixed with the combustion-supporting air.

For the working method of the oxygen-enriched acid gas incinerator burner, a flowmeter is arranged on each of the combustion-supporting air pipeline and a pure oxygen pipeline.

Due to the adoption of the above technical solutions, the present disclosure has the following beneficial effects.

1. For the oxygen-enriched acid gas incinerator burner and the working method thereof of the present disclosure, the double-layer refractory lining and the heat insulating lining are used. The outermost refractory lining adopts a heavy corundum lining with the specific gravity of 3.1 and the refractoriness of 1790° C. The intermediate refractory lining adopts a high-aluminum hollow ball castable lining with 85% of Al3O2, which can effectively reduce the mass of equipment and resist to high-speed airflow scouring, acid corrosion, H2S corrosion, and thermal shock.

2. The pure oxygen spray gun, the acid gas spray gun, and the fuel gas spray gun of the present disclosure are in a pipe-in-pipe structure. The fuel gas spray gun is used to for hearth temperature rise during start-up, so as to ensure a reaction temperature. The acid gas spray gun is used to incinerate the acid gas during the operation of the equipment. The outer wall of the diversion pipe is configured with the acid gas cyclone, which ensures that there is enough acid gas to strengthen mixing. Thus, the acid gas and air can form strong vortex mixing, the mixing effect is good, the combustion is strong and complete, and the flame turbulence is large, the excess air coefficient can be effectively reduced, and the sulfur recovery rate can be effectively improved. The pure oxygen spray gun is used to separately introduce the pure oxygen to participate in combustion in the oxygen-enriched combustion manner.

3. According to the present disclosure, the refractory lining is cast into a tapered throat opening. The acid gas and the oxygen-enriched air are sprayed into the combustion chamber from the throat opening after being mixed at a throat, so as to form a flame expanded in a vortex. A reasonable throat opening spraying speed is selected to prevent flashback. Since airflow is expanded around, a negative pressure area is generated in the center to attract the incompletely combusted gas downstream to flow back to a central area of the flame for further combustion, a cyclic combustion process is formed, thereby achieving a very good combustion effect.

4. According to the present disclosure, the combustion-supporting air inlet and the gas collection chamber are arranged, which are used to realize external mixed diffusion combustion by introducing the combustion-supporting air in the oxygen-excess combustion manner. The gas collection chamber is formed by building the bricks. The bricks are made of a zirconium-containing corundum material, and have excellent resistance to high-speed airflow scouring, acid corrosion, and heat shock. A circle of diversion holes is formed in the gas collection chamber formed by building, and the diversion holes are uniformly distributed in a right-handed rotation manner when looked from an upstream direction, which is more beneficial to realizing fuel-air mixing, realizing excess supply of the combustion-supporting air, and ensuring the stability of a diffusion combustion flame.

5. The present disclosure discloses the burner which has two combustions manners of oxygen-excess combustion and oxygen-enriched combustion. The oxygen-enriched combustion is to increase the proportion of oxygen in combustion-supporting air to enhance the combustion by separately introducing the pure oxygen, so as to achieve the purposes of high efficiency and energy conservation. The temperature of the flame in oxygen-enriched combustion is higher, which can improve the heat transfer efficiency and the energy utilization rate, obtain better ignition characteristics, and improve the flame stability. The improvement of the flame speed can expand the combustion load ratio, and improve the flame characteristics and the flame shape control. The reduction of smoke exhaust volume can improve the flexibility of production.

Figure 1:
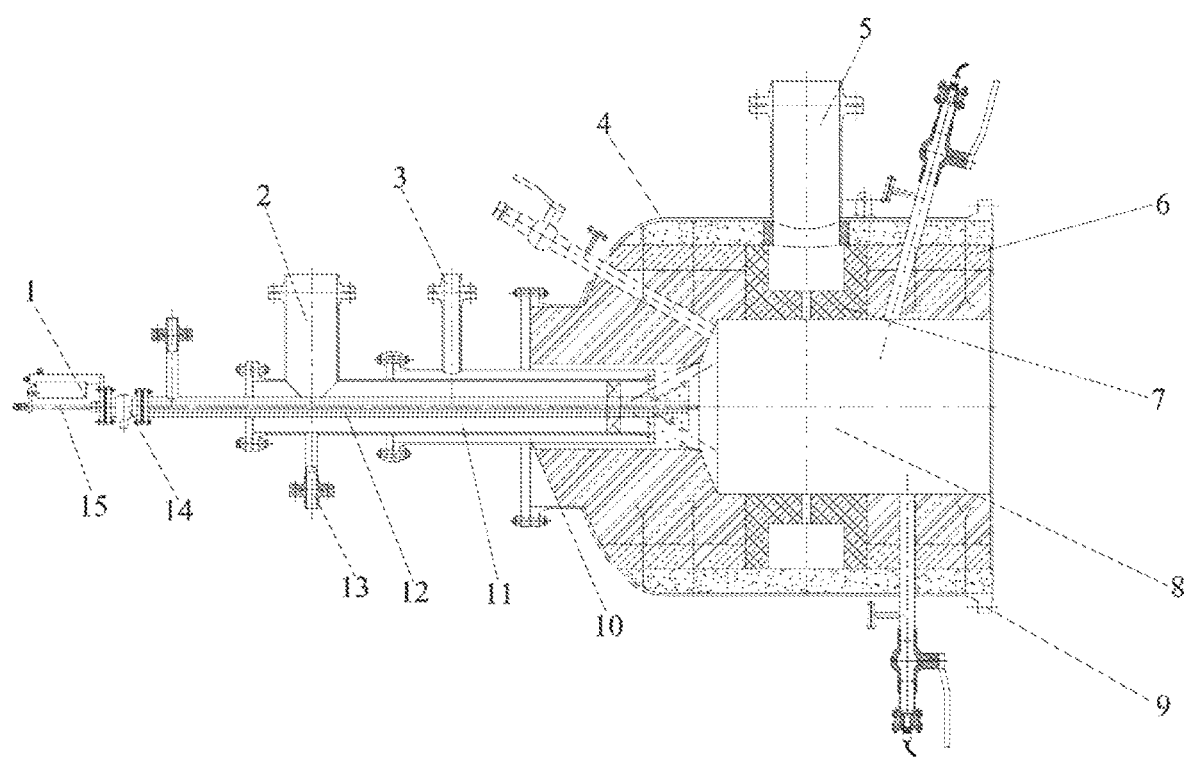
FIG. 1 is a schematic structural diagram of the present disclosure.

List of reference numerals: 1 propulsion mechanism; 2 acid gas inlet; 3 pure oxygen inlet; 4 housing; 5 combustion-supporting air inlet; 6 refractory lining; 7 gas collection chamber; 8 throat opening; 9 mounting flange; 10 pure oxygen spray gun; 11 acid gas spray gun; 12 fuel gas spray gun; 13 purging hole; 14 ball valve; 15 high-energy igniter; 16 diversion hole; 17 flame detector A; 18 flame detector B; 19 fire observation hole A; and 20 fire observation hole B.

DETAILED DESCRIPTION OF THE EMBODIMENTS

The present disclosure can be explained in detail through the following embodiments. An objective of disclosing the present disclosure is to protect all technical improvements within the scope of the present disclosure.

Figure 2:
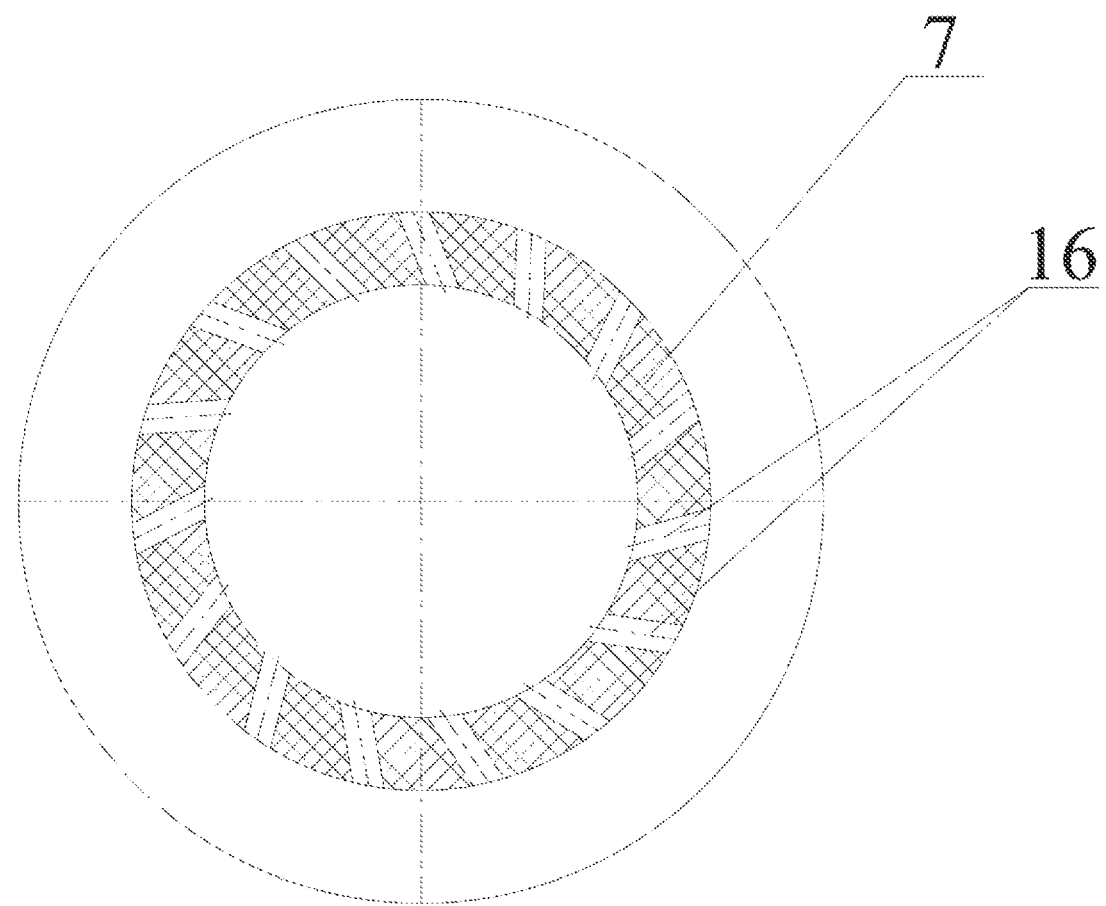
FIG. 2 is a distribution diagram of diversion holes of the present disclosure.
Figure 3:
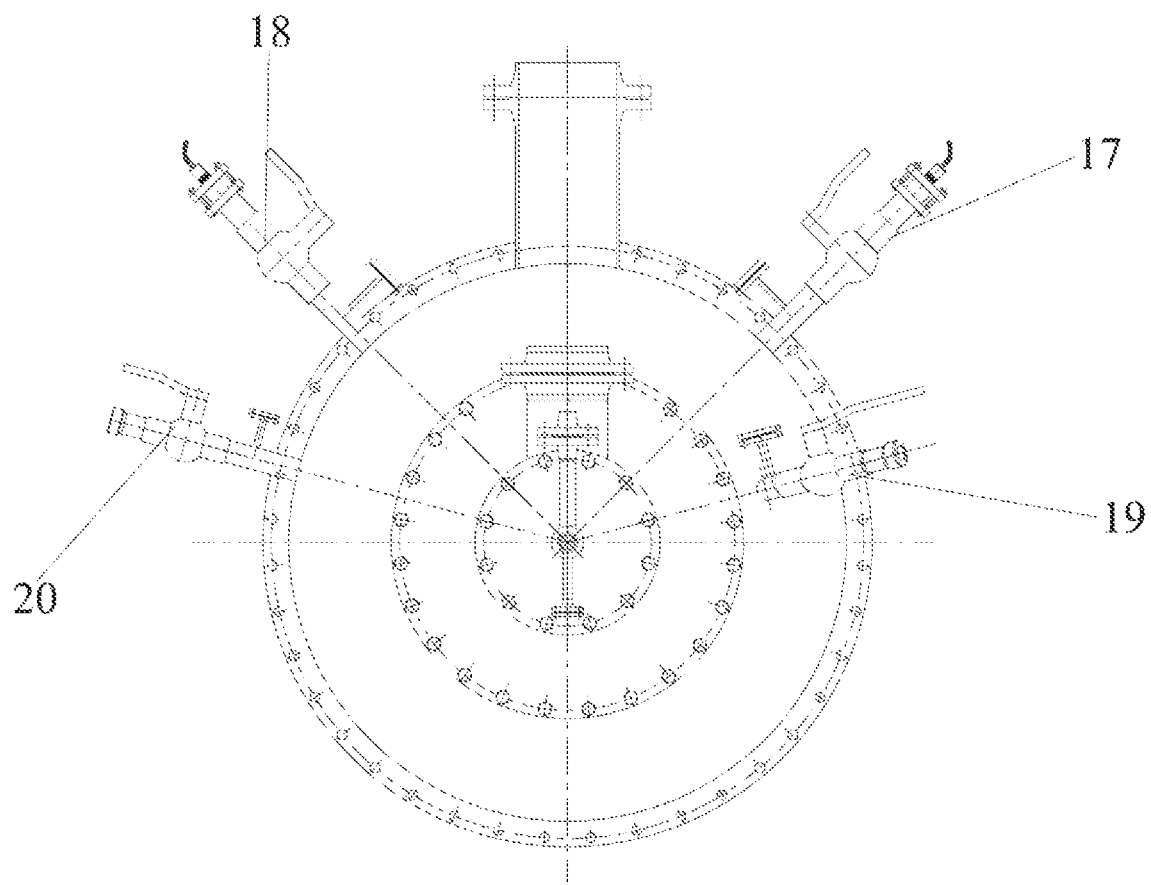
FIG. 3 is a side view of the present disclosure.

In combination with FIG. 1 to FIG. 3, the oxygen-enriched acid gas incinerator burner includes a propulsion mechanism 1, a pure oxygen spray gun 10, an acid gas spray gun 11, a fuel gas spray gun 12, and a housing 4. A refractory lining 6 is arranged on an inner wall of the housing 4. An inner cavity is formed in the inner center of the housing at one end of the housing 4. A rear part of the inner cavity is connected to a throat opening 8. The pure oxygen spray gun 10, the acid gas spray gun 11, and the fuel gas spray gun 12 are arranged as a pipe-in-pipe structure from outside to inside. A rear part of the pure oxygen spray gun 10 is fixed within the inner cavity through a flange at an outer end of the housing 4. A front part of the acid gas spray gun 11 is fixed through a flange at an outer end of the pure oxygen spray gun 10. A front part of the fuel gas spray gun 12 is fixed through a flange at an outer end of the acid gas spray gun 11. A combustion-supporting air inlet 5 is formed in a position, corresponding to the throat opening, on the housing 4. A lower part of the combustion-supporting air inlet 5 is communicated with a gas collection chamber 7. The gas collection chamber 7 is formed by building special shaped-bricks made of a zirconium-containing corundum material, and is arranged along a circumferential surface of the throat opening 8 and is arranged in the refractory lining 6. A circle of diversion holes 16 communicated with the throat opening are formed in the gas collection chamber 7. The diversion holes are all uniformly distributed in a right-handed rotation manner when looked from an upstream direction.

The design pressure of the housing 4 is 0.05 to 0.35 MPa, which ensures that the mechanical strength of the housing can bear the pressure of internal explosion.

According to the oxygen-enriched acid gas incinerator burner, a flame stabilizing cover is arranged at the position, close to the throat opening, on a rear part of the fuel gas spray gun 12. A fuel gas inlet is formed in the rear part of the fuel gas spray gun 12. A rear end of the fuel gas spray gun 12 is connected with a ball valve 14 and a high-energy igniter 15 in sequence.

Further, the high-energy igniter 15 can realize automatic ignition of an ignition burner, can greatly reduce the labor intensity of burner during ignition, and improve the success rate of the ignition. An electric igniter is provided with a propulsion mechanism 1. After the ignition is completed, an electrode head exits a high-temperature area to avoid high-temperature damage and prolong the service life.

According to the oxygen-enriched acid gas incinerator burner, a pure oxygen inlet 3 is formed in the rear part of the pure oxygen spray gun 10. An acid gas inlet 2 is formed in a rear part of the acid gas spray gun 11. A fuel gas inlet is formed in the rear part of the fuel gas spray gun 12.

According to the oxygen-enriched acid gas incinerator burner, the throat opening 8 is formed by casting the refractory lining 6. A front end of the throat opening is a horn-shaped tapered section, and a rear part of the tapered section is communicated with a straight section.

According to the oxygen-enriched acid gas incinerator burner, the refractory lining 6 is arranged as a double-layer. A heat insulating lining is arranged inside the double-layer refractory lining. The outermost refractory lining is made of heavy corundum with the specific gravity of 3.1 and the refractoriness of 1790° C. The refractoriness is the highest temperature that a material is capable of enduring. The intermediate refractory lining is made of high-aluminum hollow ball castable with 85% of $Al_3O_2$. The heat insulating lining is made of high-aluminum material with the specific gravity of 1.4, the refractoriness of 1650° C., and the highest operating temperature of 1400° C.

Further, the refractory lining 6 is cast into a tapered throat opening. The acid gas and the oxygen-enriched air are sprayed into the combustion chamber from the throat opening after being mixed at a throat, so as to form a flame expanded in a vortex. A reasonable throat opening spraying speed is selected to prevent flashback. Since airflow is expanded around, a negative pressure area is generated in the center to attract the incompletely combusted gas downstream to flow back to a central area of the flame for further combustion, a cyclic combustion process is formed, thereby achieving a very good combustion effect.

According to the oxygen-enriched acid gas incinerator burner, an acid gas cyclone is arranged on an outer wall of a diversion pipe of the acid gas spray gun 11.

According to the oxygen-enriched acid gas incinerator burner, the flame stabilizing cover is formed by combining a horn-shaped tapered stainless steel housing and a corundum castable filled inside the horn-shaped tapered stainless steel housing, so that the air and the acid gas are externally mixed, diffused and burned along an expansion angle, which can strengthen the mixing of air and fuel gas, eliminate carbon precipitation, stabilize a flame, and avoid flashback under low load conditions, so as to improve the regulation ratio range and the combustion efficiency.

According to the oxygen-enriched acid gas incinerator burner, a flame detector A 17 and a flame detector B 18 are fixed to the housing 4 at an interval. Inner ends of the flame detector A 17 and the flame detector B 18 are communicated with the throat opening.

Further, the two flame detectors are arranged to respectively monitor an ever-lasting lamp flame and a main flame in real time, can upload a flame signal and interlock with a Distributed Control System (DCS), and respectively perform collaborative linkage protection with two-position valves of corresponding pipelines to cut off the supply of the fuel gas and the acid gas when the flame goes out, so as to avoid an explosion accident.

According to the oxygen-enriched acid gas incinerator burner, a fire observation hole A 19 and a fire observation hole B 20 are also formed in the housing 4 at an interval.

Further, two positive pressure fire observation holes are formed. A cut-off valve is arranged at a fire observation pipeline. Meanwhile, a meter air cooling opening is formed to blow meter cooling air to achieve a gas sealing protection effect to ensure the safety of fire observation.

It is provided a working method of the oxygen-enriched acid gas incinerator burner, in the oxygen-excess combustion manner. In the method, external mixed diffusion combustion is realized by introducing combustion-supporting air. Specific operation steps are as follows: acid gas is introduced through the acid gas inlet 2, fuel gas is introduced through the fuel gas inlet, combustion-supporting air is introduced through the combustion-supporting air inlet 5, the combustion-supporting air is mixed with the fuel gas and the acid gas through the circle of right-handed diversion holes in the gas collection chamber, and the mixed gas is sprayed into the combustion chamber through the throat opening.

For the working method of the oxygen-enriched acid gas incinerator burner, in the oxygen-enriched combustion manner, pure oxygen is introduced to participate in combustion on the basis of the oxygen-excess combustion. Specific operation steps are as follows: combustion-supporting air is introduced through the combustion-supporting air inlet 5, pure oxygen is introduced through the pure oxygen inlet 3, the introduction of pure oxygen is activated and deactivated under the control of a PLC according to a predetermined proportionality coefficient, that is, the pure oxygen is intermittently introduced to participate in combustion to enhance a heat transfer process, and a mixed gas is sprayed into the combustion chamber through the throat opening after the pure oxygen is mixed with the combustion-supporting air. In order to facilitate distributed control, flowmeters are arranged on the fuel gas pipeline, the combustion-supporting air pipeline, and the pure oxygen pipeline respectively.

Embodiment 1 Oxygen-Excess Combustion Manner

The oxygen-enriched acid gas incinerator burner of the present disclosure is implemented. During use, the acid gas is supplied by the acid gas inlet 2 at the rear part of the acid gas spray gun 11. The acid gas spray gun 11 is used to incinerate the acid gas during the operation of equipment. The outer wall of the diversion pipe is provided with an acid gas cyclone to ensure that there is enough acid gas to strengthen mixing. The fuel gas is supplied by the fuel gas inlet at the rear part of the fuel gas spray gun 12. The fuel gas spray gun 12 is used for heath temperature rise during start-up to ensure a reaction temperature. Nozzles are made of heat-resistant and corrosion-resistant high alloy steel. The combustion-supporting air is introduced from the combustion-supporting air inlet 5. The combustion-supporting air is mixed with the introduced fuel gas and the acid gas through the circle of right-handed diversion holes on the gas collection chamber, and then is sprayed into the combustion chamber from the throat opening after being mixed. The combustion-supporting air inlet and the gas collection chamber are arranged for introducing the combustion-supporting air in the oxygen-excess combustion manner to realize external mixed diffusion combustion. The combustion-supporting air enters the throat opening through the right-handed diversion holes in the gas collection chamber, which is beneficial to fuel gas-air mixing, realizing the excess supply of the combustion-supporting air, and ensuring the stability of a diffusion combustion flame.

Embodiment 2 Oxygen-Enriched Combustion

The oxygen-enriched acid gas incinerator burner of the present disclosure is implemented. During use, the combustion-supporting air is introduced through the combustion-supporting air inlet 5, and the pure oxygen is supplied by the pure oxygen inlet 3 at the rear part of the pure oxygen spray gun 10. The pure oxygen spray gun 10 is used to introduce the pure oxygen to participate in combustion on the basis of the oxygen-excess combustion manner, which can strengthen the flame intensity and improve the heat transfer efficiency. A solenoid valve is arranged at the upstream of the pure oxygen pipeline, which is opened and closed according to the predetermined proportionality coefficient under the control of the PLC, that is, the pure oxygen is intermittently introduced to participate in the combustion and strengthen the heat transfer process. The flowmeters are mounted on the fuel gas pipeline, the combustion-supporting air pipeline, and the pure oxygen pipeline respectively. A fuel gas-air proportion is controlled through a flowmeter regulation system, that is, the change of acid gas treatment capacity causes the change of a fuel gas amount, and the amount of the combustion-supporting air changes according to the predetermined proportionality coefficient with the change of the fuel gas amount. In the oxygen-enriched working mode, the amount of the pure oxygen introduced will change along with the change of the amount of the combustion-supporting air, which ensures an oxygen-enriched atmosphere value determined according to process requirements.

The part not described in detail in the present disclosure is the prior art.

The embodiments used herein for the objective of disclosing the present disclosure are currently considered appropriate. However, it should be understood that the present disclosure is intended to include all changes and improvements of all embodiments that fall within the present concept and the scope of the present disclosure.

What is claimed is:

1. An oxygen-enriched acid gas incinerator burner, comprising
a propulsion mechanism, a pure oxygen spray gun, an acid gas spray gun, a fuel gas spray gun, and a housing, wherein:
a refractory lining is arranged on an inner wall of the housing;
an inner cavity is formed in an inner center of the housing at an end of the housing;
a rear part of the inner cavity is connected to a throat opening;
the pure oxygen spray gun, the acid gas spray gun, and the fuel gas spray gun are arranged in a pipe-in pipe structure from outside to inside;
a rear part of the pure oxygen spray gun is fixed within the inner cavity through a flange at an outer end of the housing;
a front part of the acid gas spray gun is fixed through a flange at an outer end of the pure oxygen spray gun;
a front part of the fuel gas spray gun is fixed through a flange at an outer end of the acid gas spray gun;
a combustion-supporting air inlet is formed at a position, corresponding to the throat opening, on the housing;
a lower part of the combustion-supporting air inlet is communicated with a gas collection chamber; the gas collection chamber is formed by building bricks made of a zirconium-containing corundum material, is arranged along a circumferential surface of the throat opening, and is arranged in the refractory lining;
a circle of diversion holes communicated with the throat opening are formed in the gas collection chamber; and
the diversion holes are in a right-handed rotation arrangement when looked from an upstream direction, and the diversion holes are uniformly distributed along a circumferential direction of the gas collection chamber; and
wherein, a rear end of the fuel gas spray gun is connected with a ball valve and a high-energy igniter in sequence, and the propulsion mechanism is provided on the high-energy igniter.

2. The oxygen-enriched acid gas incinerator burner according to claim 1, wherein:
a flame stabilizing cover is arranged at a position, close to the throat opening, on a rear part of the fuel gas spray gun;
the flame stabilizing cover is formed by combining a horn-shaped tapered stainless steel housing and a corundum castable filled inside the horn-shaped tapered stainless steel housing;
the throat opening is formed by casting the refractory lining;
a front end of the throat opening is a horn-shaped tapered section, and a rear part of the tapered section is communicated with a straight section; and
a fuel gas inlet is formed in the rear part of the fuel gas spray gun.

3. The oxygen-enriched acid gas incinerator burner according to claim 1, wherein:
a pure oxygen inlet is formed in the rear part of the pure oxygen spray gun;
an acid gas inlet is formed in a rear part of the acid gas spray gun; and
a fuel gas inlet is formed in the rear part of the fuel gas spray gun.

4. The oxygen-enriched acid gas incinerator burner according to claim 1, wherein:

the refractory lining includes two layers;
a heat insulating lining is arranged inside the refractory lining;
an outer layer of the two layers is made of a heavy corundum lining with a specific gravity of 3.1 and a refractoriness of 1790° C.;
an inner outer of the two layers is made of a high-aluminum hollow ball castable lining with 85% of $Al_3O_2$; and
the heat insulating lining is made of a high-aluminum material with a specific gravity of 1.4, a refractoriness of 1650° C. and a highest operating temperature of 1400° C.

5. The oxygen-enriched acid gas incinerator burner according to claim 1, wherein an acid gas cyclone is arranged on an outer wall of a diversion pipe of the acid gas spray gun.

6. The oxygen-enriched acid gas incinerator burner according to claim 1, wherein:
a flame detector A and a flame detector B are fixed on the housing at an interval;
inner ends of the flame detector A and the flame detector B are communicated with the throat opening; and
a fire observation hole A and a fire observation hole B are also formed in the housing at an interval.

7. A working method of an oxygen-enriched acid gas incinerator burner comprising
a propulsion mechanism, a pure oxygen spray gun, an acid gas spray gun, a fuel gas spray gun and a housing, wherein:
a refractory lining is arranged on an inner wall of the housing;
an inner cavity is formed in an inner center of the housing at an end of the housing;
a rear part of the inner cavity is connected to a throat opening;
the pure oxygen spray gun, the acid gas spray gun, and the fuel gas spray gun are arranged in a pipe-in pipe structure from outside to inside;
a rear part of the pure oxygen spray gun is fixed within the inner cavity through a flange at an outer end of the housing;
a front part of the acid gas spray gun is fixed through a flange at an outer end of the pure oxygen spray gun;
a front part of the fuel gas spray gun is fixed through a flange at an outer end of the acid gas spray gun;
a combustion-supporting air inlet is formed at a position, corresponding to the throat opening, on the housing;
a lower part of the combustion-supporting air inlet is communicated with a gas collection chamber;
the gas collection chamber is formed by building bricks made of a zirconium-containing corundum material, is arranged along a circumferential surface of the throat opening, and is arranged in the refractory lining; a circle of diversion holes communicated with the throat opening are formed in the gas collection chamber; and the diversion holes are in a right-handed rotation arrangement when looked from an upstream direction, and the diversion holes are uniformly distributed along a circumferential direction of the gas collection chamber;
wherein, a rear end of the fuel gas spray gun is connected with a ball valve and a high-energy igniter in sequence, and the propulsion mechanism is provided on the high-energy igniter, and
wherein external mixed diffusion combustion with excess oxygen is realized by introducing combustion-supporting air according to a series of steps comprising:
introducing acid gas through the acid gas inlet, introducing fuel gas through the fuel gas inlet, introducing combustion-supporting air through the combustion-supporting air inlet, mixing the combustion-supporting air with the fuel gas and the acid gas through the circle of diversion holes in the gas collection chamber, and spraying mixed gas into the combustion chamber through the throat opening.

8. The working method of the oxygen-enriched acid gas incinerator burner according to claim 7, wherein a flowmeter is arranged on each of a fuel gas pipeline and a combustion-supporting air pipeline.

9. The working method of the oxygen-enriched acid gas incinerator burner according to claim 7, wherein:
a flame stabilizing cover is arranged at a position, close to the throat opening, on a rear part of the fuel gas spray gun;
the flame stabilizing cover is formed by combining a horn-shaped tapered stainless steel housing and a corundum castable filled inside the horn-shaped tapered stainless steel housing;
the throat opening is formed by casting the refractory lining;
a front end of the throat opening is a horn-shaped tapered section, and a rear part of the tapered section is communicated with a straight section;
a fuel gas inlet is formed in the rear part of the fuel gas spray gun; and
a rear end of the fuel gas spray gun is connected with a ball valve and a high-energy igniter in sequence.

10. The working method of the oxygen-enriched acid gas incinerator burner according to claim 7, wherein:
a pure oxygen inlet is formed in the rear part of the pure oxygen spray gun;
an acid gas inlet is formed in a rear part of the acid gas spray gun; and
a fuel gas inlet is formed in the rear part of the fuel gas spray gun.

11. The working method of the oxygen-enriched acid gas incinerator burner according to claim 7, wherein:
the refractory lining includes two layers;
a heat insulating lining is arranged inside the refractory lining;
an outer layer of the two layers is made of a heavy corundum lining with a specific gravity of 3.1 and a refractoriness of 1790° C.;
an inner outer of the two layers is made of a high-aluminum hollow ball castable lining with 85% of $Al_3O_2$; and
the heat insulating lining is made of a high-aluminum material with a specific gravity of 1.4, a refractoriness of 1650° C. and a highest operating temperature of 1400° C.

12. The working method of the oxygen-enriched acid gas incinerator burner according to claim 7, wherein an acid gas cyclone is arranged on an outer wall of a diversion pipe of the acid gas spray gun.

13. The working method of the oxygen-enriched acid gas incinerator burner according to claim 7, wherein:
a flame detector A and a flame detector B are fixed on the housing at an interval;
inner ends of the flame detector A and the flame detector B are communicated with the throat opening; and a fire observation hole A and a fire observation hole B are also formed in the housing at an interval.

14. A working method of an oxygen-enriched acid gas incinerator burner comprising a propulsion mechanism, a pure oxygen spray gun, an acid gas spray gun, a fuel gas spray gun and a housing,
wherein:
a refractory lining is arranged on an inner wall of the housing;
an inner cavity is formed in an inner center of the housing at an end of the housing;
a rear part of the inner cavity is connected to a throat opening;
the pure oxygen spray gun, the acid gas spray gun, and the fuel gas spray gun are arranged in a pipe-in pipe structure from outside to inside;
a rear part of the pure oxygen spray gun is fixed within the inner cavity through a flange at an outer end of the housing;
a front part of the acid gas spray gun is fixed through a flange at an outer end of the pure oxygen spray gun;
a front part of the fuel gas spray gun is fixed through a flange at an outer end of the acid gas spray gun;
a combustion-supporting air inlet is formed at a position, corresponding to the throat opening, on the housing;
a lower part of the combustion-supporting air inlet is communicated with a gas collection chamber;
the gas collection chamber is formed by building bricks made of a zirconium-containing corundum material, is arranged along a circumferential surface of the throat opening, and is arranged in the refractory lining;
a circle of diversion holes communicated with the throat opening are formed in the gas collection chamber; and
the diversion holes are in a right-handed rotation arrangement when looked from an upstream direction, and the diversion holes are uniformly distributed along a circumferential direction of the gas collection chamber;
wherein in an oxygen-enriched combustion manner, pure oxygen is introduced to participate in combustion on a basis of an oxygen-excess combustion, and specific operation steps are as follows: introducing combustion-supporting air through the combustion-supporting air inlet, introducing pure oxygen through the pure oxygen inlet, activating and deactivating introduction of the pure oxygen under control of a Programmable Logic Controller according to a predetermined proportionality coefficient, that is, intermittently introducing the pure oxygen to participate in combustion to enhance a heat transfer process, and spraying a mixed gas into the combustion chamber through the throat opening after the pure oxygen is mixed with the combustion-supporting air; and
wherein, a rear end of the fuel gas spray gun is connected with a ball valve and a high-energy igniter in sequence, and the propulsion mechanism is provided on the high-energy igniter.

15. The working method of the oxygen-enriched acid gas incinerator burner according to claim 14, wherein a flowmeter is arranged on each of the combustion-supporting air pipeline and a pure oxygen pipeline.

16. The working method of the oxygen-enriched acid gas incinerator burner according to claim 14, wherein:
a flame stabilizing cover is arranged at a position, close to the throat opening, on a rear part of the fuel gas spray gun;
the flame stabilizing cover is formed by combining a horn-shaped tapered stainless steel housing and a corundum castable filled inside the horn-shaped tapered stainless steel housing;
the throat opening is formed by casting the refractory lining;
a front end of the throat opening is a horn-shaped tapered section, and a rear part of the tapered section is communicated with a straight section;
a fuel gas inlet is formed in the rear part of the fuel gas spray gun; and
a rear end of the fuel gas spray gun is connected with a ball valve and a high-energy igniter in sequence.

17. The working method of the oxygen-enriched acid gas incinerator burner according to claim 14, wherein:
a pure oxygen inlet is formed in the rear part of the pure oxygen spray gun;
an acid gas inlet is formed in a rear part of the acid gas spray gun; and
a fuel gas inlet is formed in the rear part of the fuel gas spray gun.

18. The working method of the oxygen-enriched acid gas incinerator burner according to claim 14, wherein:
the refractory lining includes two layers;
a heat insulating lining is arranged inside the refractory lining;
an outer layer of the two layers is made of a heavy corundum lining with a specific gravity of 3.1 and a refractoriness of 1790° C.;
an inner outer of the two layers is made of a high-aluminum hollow ball castable lining with 85% of $Al_3O_2$; and
the heat insulating lining is made of a high-aluminum material with a specific gravity of 1.4, a refractoriness of 1650° C. and a highest operating temperature of 1400° C.

19. The working method of the oxygen-enriched acid gas incinerator burner according to claim 14, wherein an acid gas cyclone is arranged on an outer wall of a diversion pipe of the acid gas spray gun.

20. The working method of the oxygen-enriched acid gas incinerator burner according to claim 14, wherein:
a flame detector A and a flame detector B are fixed on the housing at an interval;
inner ends of the flame detector A and the flame detector B are communicated with the throat opening; and
a fire observation hole A and a fire observation hole B are also formed in the housing at an interval.

* * * * *